(12) United States Patent
Sakai et al.

(10) Patent No.: US 8,953,860 B2
(45) Date of Patent: Feb. 10, 2015

(54) INFORMATION PROCESSING APPARATUS AND INFORMATION PROCESSING METHOD

(75) Inventors: Yusuke Sakai, Kanagawa (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 144 days.

(21) Appl. No.: 13/235,609

(22) Filed: Sep. 19, 2011

(65) Prior Publication Data

US 2012/0082339 A1 Apr. 5, 2012

(30) Foreign Application Priority Data

Sep. 30, 2010 (JP) ................ P2010-221550
Dec. 27, 2010 (JP) ................ P2010-289780

(51) Int. Cl.
| | | |
|---|---|---|
| G06K 9/00 | (2006.01) | |
| H04N 7/15 | (2006.01) | |
| H04L 12/18 | (2006.01) | |
| H04N 7/14 | (2006.01) | |

(52) U.S. Cl.
CPC .............. *H04N 7/15* (2013.01); *H04L 12/1827* (2013.01); *H04N 7/147* (2013.01)
USPC ........................................................ 382/131

(58) Field of Classification Search
None
See application file for complete search history.

(56) References Cited

U.S. PATENT DOCUMENTS

| | | | |
|---|---|---|---|
| 7,379,568 B2 | 5/2008 | Movellan et al. | |
| 7,587,069 B2 | 9/2009 | Movellan et al. | |
| 7,624,076 B2 | 11/2009 | Movellan et al. | |
| 7,673,015 B2 | 3/2010 | Sakai et al. | |
| 8,483,428 B1* | 7/2013 | Anderson | 382/100 |
| 2003/0112358 A1* | 6/2003 | Hamada | 348/333.12 |
| 2007/0047775 A1 | 3/2007 | Okubo | |
| 2007/0070188 A1* | 3/2007 | Shyu | 348/14.11 |
| 2007/0079322 A1* | 4/2007 | Sloo et al. | 725/19 |
| 2008/0080743 A1* | 4/2008 | Schneiderman et al. | 382/118 |
| 2008/0152197 A1* | 6/2008 | Kawada | 382/115 |
| 2008/0240563 A1* | 10/2008 | Takano et al. | 382/173 |
| 2009/0046139 A1* | 2/2009 | Cutler et al. | 348/14.08 |
| 2009/0079813 A1* | 3/2009 | Hildreth | 348/14.03 |
| 2009/0175509 A1* | 7/2009 | Gonion et al. | 382/118 |
| 2009/0185033 A1* | 7/2009 | Nozaki | 348/77 |
| 2009/0190835 A1* | 7/2009 | Lee | 382/190 |
| 2009/0210491 A1* | 8/2009 | Thakkar et al. | 709/204 |
| 2009/0327418 A1* | 12/2009 | Zhang et al. | 709/204 |
| 2010/0005393 A1* | 1/2010 | Tokashiki et al. | 715/716 |
| 2010/0007796 A1* | 1/2010 | Yamaji et al. | 348/588 |
| 2010/0064334 A1* | 3/2010 | Blackburn et al. | 725/110 |

(Continued)

FOREIGN PATENT DOCUMENTS

| | | |
|---|---|---|
| JP | 2005-044330 A | 2/2005 |
| JP | 2006-050370 A | 2/2006 |
| JP | 2007-065766 A | 3/2007 |

*Primary Examiner* — Atiba O Fitzpatrick
*Assistant Examiner* — Thomas A James
(74) *Attorney, Agent, or Firm* — Lerner, David, Littenberg, Krumholz & Mentlik, LLP

(57) ABSTRACT

An information processing apparatus may include an obtaining unit to obtain a number of users from information on detection of a face region including a face in a captured image provided at the apparatus. The apparatus also may include a setting unit to set a display region for content and a display region for a captured image in a display screen; and a display image generation unit to generate a display image to be displayed in the display region for a captured image, in accordance with the information on the detection, the number of users, and the display region set for a captured image.

18 Claims, 15 Drawing Sheets

(56) References Cited

U.S. PATENT DOCUMENTS

| | | |
|---|---|---|
| 2010/0118109 A1 | 5/2010 | Sakai et al. |
| 2010/0171807 A1* | 7/2010 | Tysso |
| 2010/0225815 A1* | 9/2010 | Khatri .......................... 348/569 |
| 2011/0044444 A1* | 2/2011 | Abramson ............... 379/207.02 |
| 2011/0050842 A1* | 3/2011 | Saleh et al. ................ 348/14.08 |
| 2011/0074915 A1* | 3/2011 | Ferren et al. ............... 348/14.11 |
| 2011/0115877 A1* | 5/2011 | Kang ........................ 348/14.12 |
| 2011/0116685 A1* | 5/2011 | Sugita .......................... 382/103 |
| 2011/0181683 A1* | 7/2011 | Nam ......................... 348/14.07 |
| 2011/0216155 A1* | 9/2011 | Sakai et al. ................ 348/14.07 |
| 2011/0271197 A1* | 11/2011 | Jones et al. .................. 715/739 |
| 2011/0271210 A1* | 11/2011 | Jones et al. .................. 715/753 |
| 2011/0292232 A1* | 12/2011 | Zhang et al. ............... 348/222.1 |
| 2012/0027256 A1* | 2/2012 | Kiyohara et al. ............. 382/103 |
| 2012/0057794 A1* | 3/2012 | Tsurumi et al. .............. 382/195 |
| 2012/0167001 A1* | 6/2012 | Ortiz et al. .................... 715/781 |
| 2012/0218375 A1* | 8/2012 | Hetherington et al. .... 348/14.12 |
| 2012/0313851 A1* | 12/2012 | Kasahara ...................... 345/156 |
| 2012/0327172 A1* | 12/2012 | El-Saban et al. ........... 348/14.02 |
| 2013/0002806 A1* | 1/2013 | Hines et al. ................ 348/14.08 |
| 2013/0027503 A1* | 1/2013 | Hildreth .................... 348/14.03 |
| 2013/0070973 A1* | 3/2013 | Saito et al. ................... 382/118 |
| 2013/0100238 A1* | 4/2013 | Wharton et al. ........... 348/14.08 |
| 2013/0182914 A1* | 7/2013 | Sakai et al. ................... 382/115 |
| 2013/0201105 A1* | 8/2013 | Ptucha et al. ................. 345/158 |
| 2013/0231185 A1* | 9/2013 | Steil .............................. 463/35 |
| 2013/0293739 A1* | 11/2013 | Ebato et al. ................ 348/222.1 |
| 2014/0009558 A1* | 1/2014 | Shyu .......................... 348/14.02 |
| 2014/0015916 A1* | 1/2014 | Shyu .......................... 348/14.07 |
| 2014/0055429 A1* | 2/2014 | Kwon et al. .................. 345/204 |
| 2014/0229866 A1* | 8/2014 | Gottlieb ........................ 715/758 |

\* cited by examiner

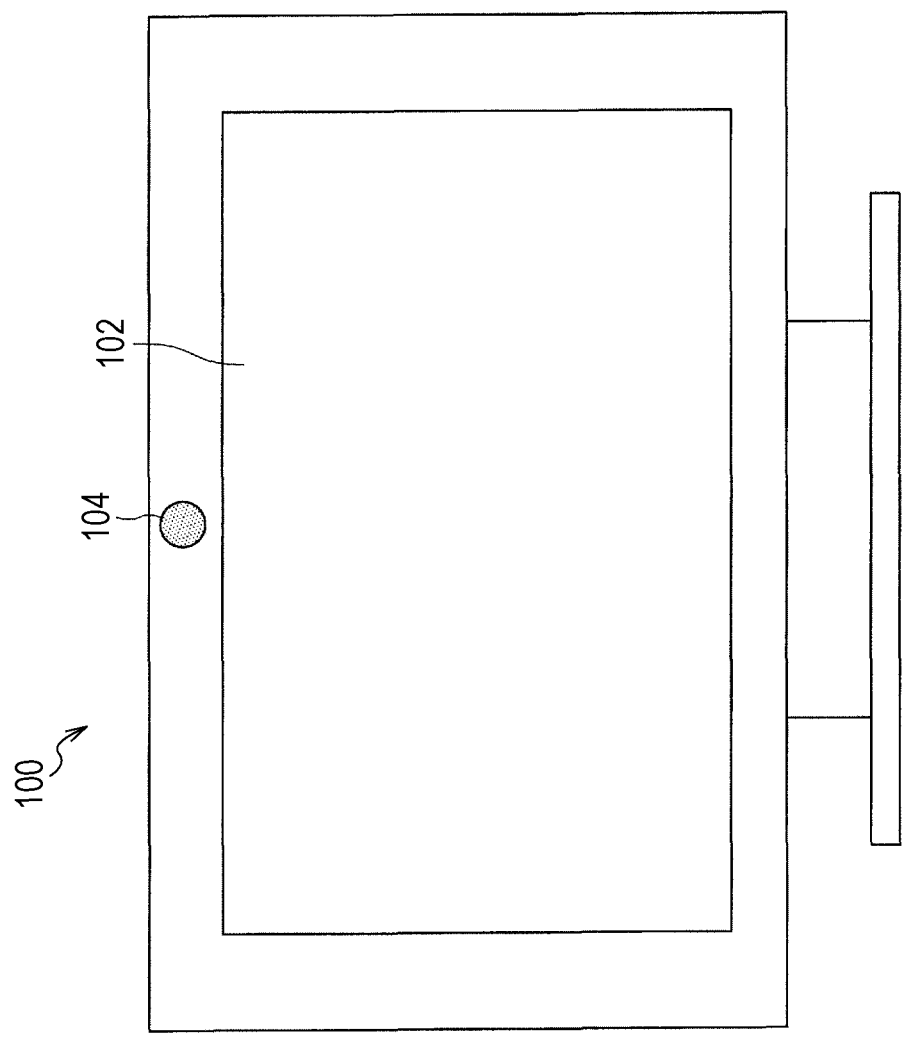

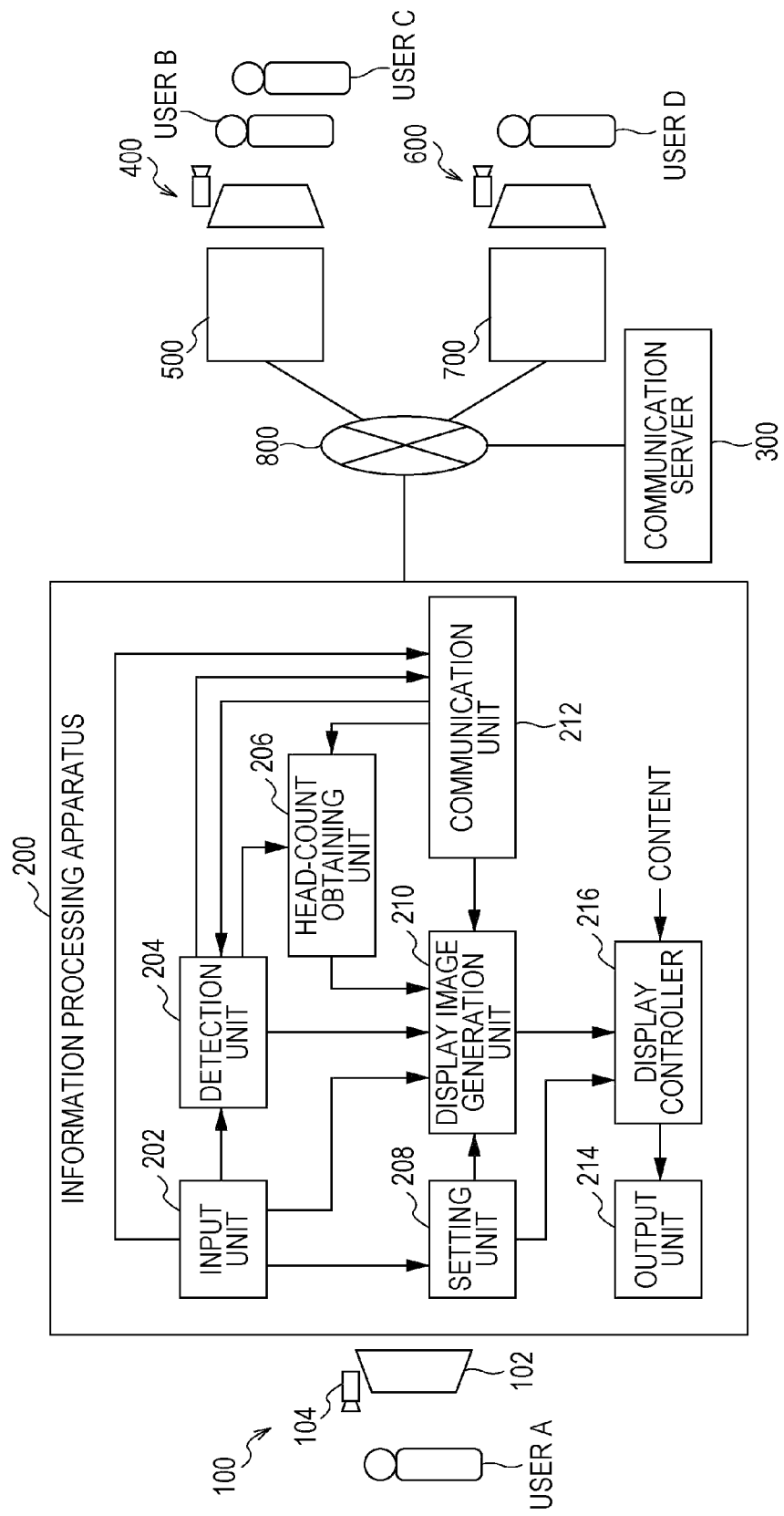

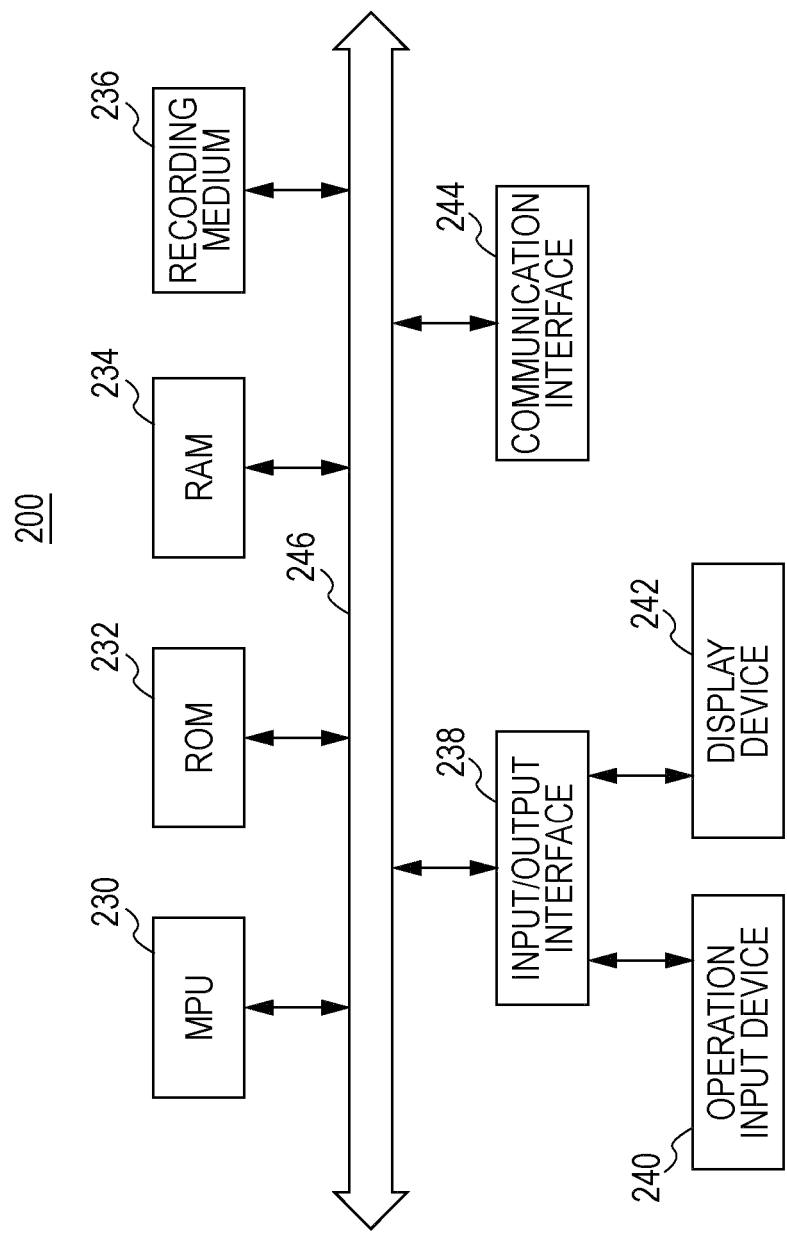

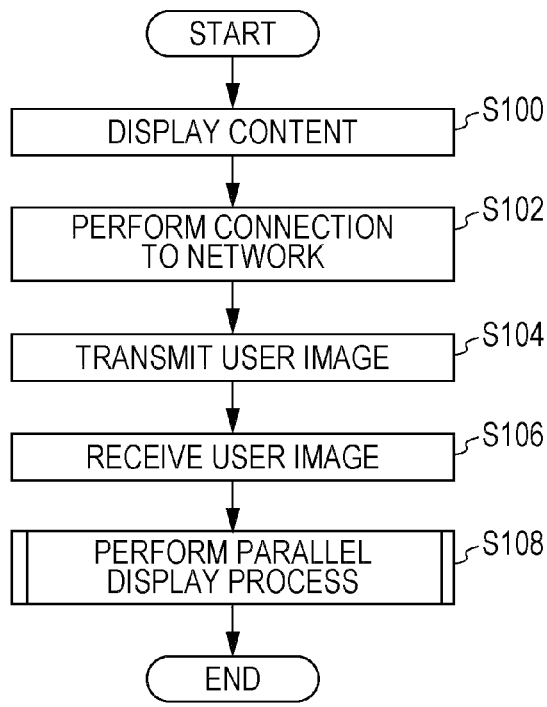
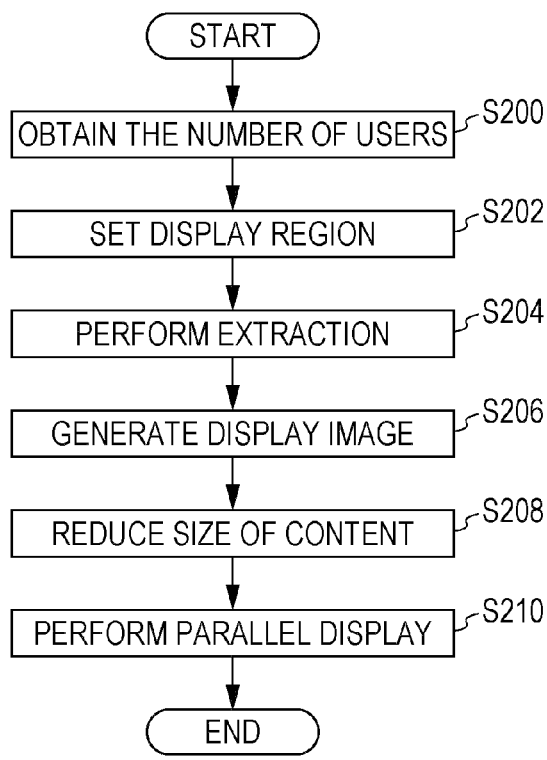

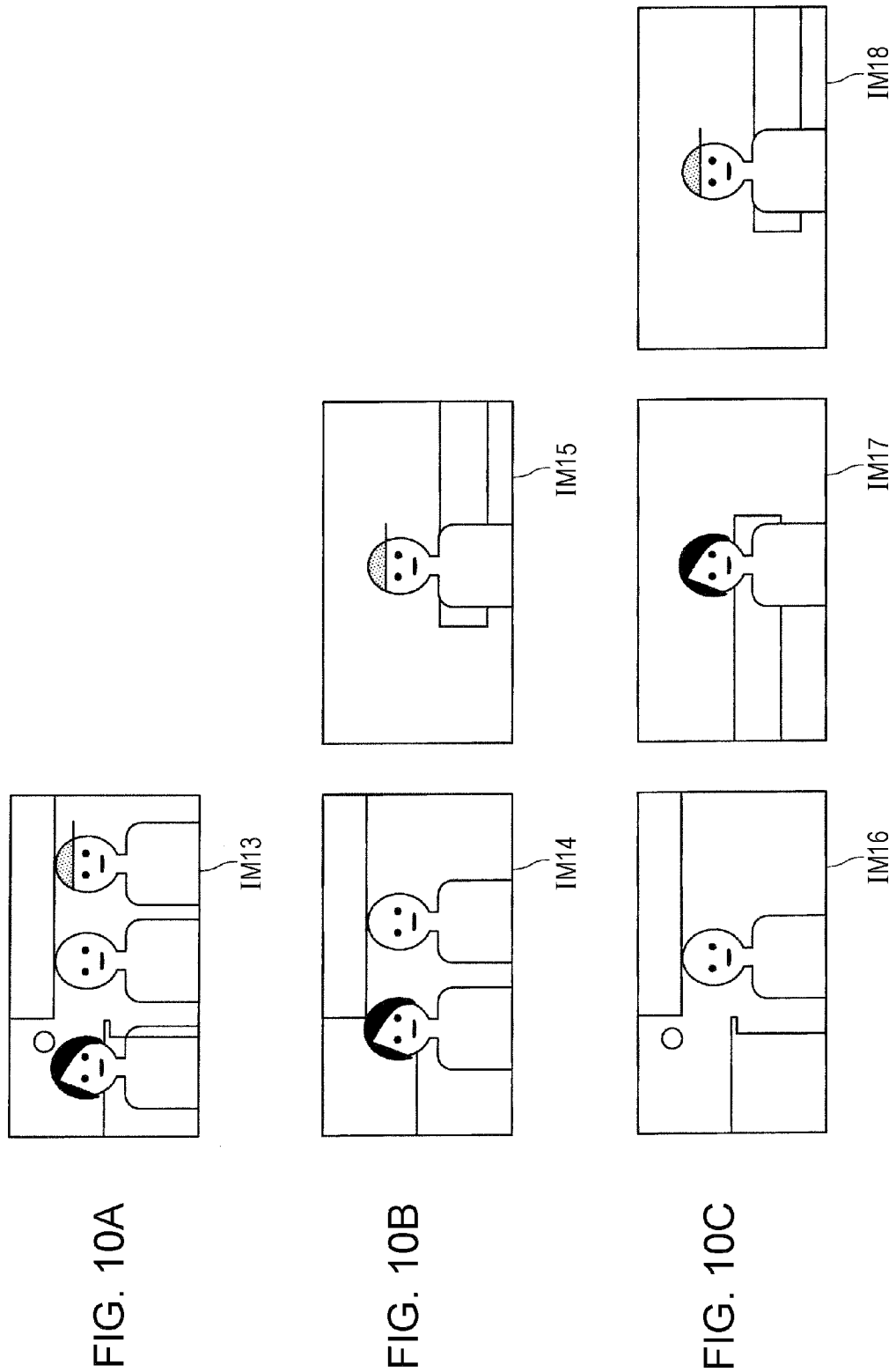

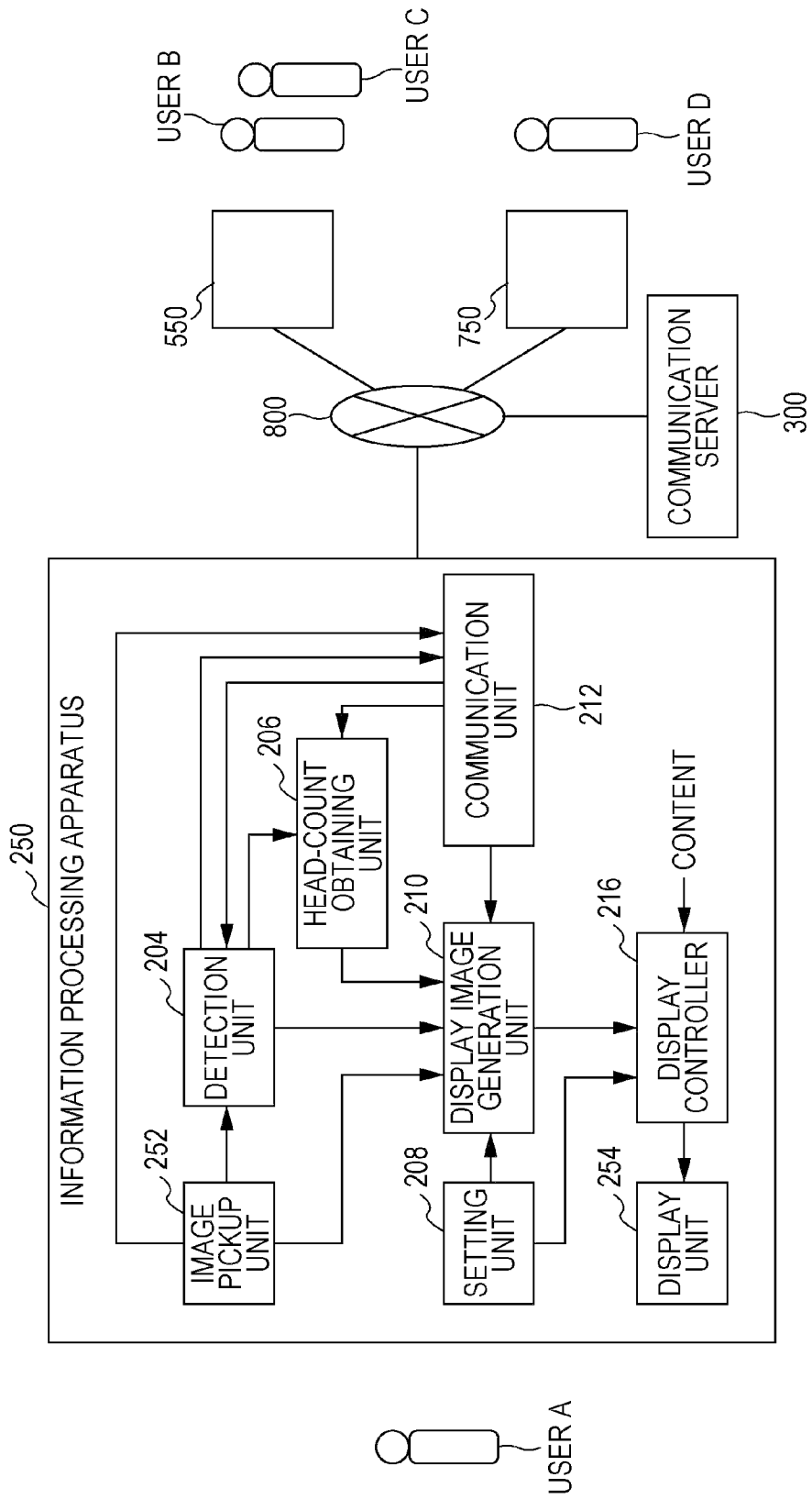

INFORMATION PROCESSING APPARATUS AND INFORMATION PROCESSING METHOD

CROSS-REFERENCE TO RELATED APPLICATIONS

This application claims priority from Japanese Patent Application No. 2010-221550 filed in the Japan Patent Office on Sep. 30, 2010 and Japanese Patent Application No. 2010-289780 filed in the Japan Patent Office on Dec. 27, 2010, the entire contents of which are hereby incorporated by reference.

BACKGROUND

The present disclosure relates to an information processing apparatus and an information processing method.

In general, as devices used for communication between users being in different locations, telephones, so-called videophones, and video conference systems have been used. In addition, text chat and video chat including video images and audio have also been performed through the Internet using personal computers.

Therefore, electronic devices and like devices have been offering high functionalities and an increasing range of functions. For example, a television receiver includes a network communication function which enables not only reception of video and audio content of a program from a broadcasting station and display of the content but also transmission of various information to and reception of various information from another receiver.

For example, Japanese Unexamined Patent Application Publication No. 2006-50370 discloses a technique of displaying, when a user views program content of television broadcasting using a television receiver, information on registered other users (such as thumbnail images of the other users, and names, channels, and video images of content viewed by the other users) together with the program content.

Here, when display of content and display of an image externally received through network communication (hereinafter referred to as a "communication image") are performed in parallel in a display device such as a television receiver, a PIP (Picture in Picture) display method or a POP (Picture on Picture) display method is generally used.

However, there arises a problem in that, when the PIP display method or the POP display method is used, a portion of the displayed content is hidden by the displayed communication image, and accordingly, it is difficult to view the content. Furthermore, in general, since a region for displaying the communication image is limited in a display screen, a size of the communication image is reduced in the display screen. Therefore, there arises a problem in that sizes of images of other users included in the communication image become small, and accordingly, it is difficult to identify the users and image quality of the communication image is deteriorated.

Accordingly, it is desirable to provide an improved information processing apparatus and an improved information processing method which have novelty and which are capable of appropriately performing display of content and display of a communication image when the content and the communication image are displayed in parallel.

SUMMARY

In accordance with one aspect of the embodiments, an information processing apparatus may include an obtaining unit to obtain a number of users from information on detection of a face region including a face in a captured image provided at the apparatus. The apparatus also may include a setting unit to set a display region for content and a display region for a captured image in a display screen. Further, the apparatus may include a display image generation unit to generate a display image to be displayed in the display region for a captured image, in accordance with the information on the detection, the number of users, and the display region set for a captured image.

In accordance with another aspect of the embodiments, a method may include obtaining a number of users from information on detection of a face region including a face in a captured image; setting a display region for content and a display region for a captured image in a display screen; and generating a display image to be displayed in the display region for a captured image, in accordance with the information on the detection, the number of users, and the display region set for a captured image. In such method, at least one of the obtaining, the setting and the generating may be by a processor.

In accordance with another aspect of the embodiments, a non-transitory recording medium may be recorded with a computer-readable program having instructions executable by a processor. The program may include obtaining a number of users from information on detection of a face region including a face in a captured image; setting a display region for content and a display region for a captured image in a display screen; and generating a display image to be displayed in the display region for a captured image, in accordance with the information on the detection, the number of users, and the display region set for a captured image.

As described above, display of content and display of a communication image may be appropriately performed in parallel.

BRIEF DESCRIPTION OF THE DRAWINGS

FIG. 1 is a diagram illustrating a display system according to an embodiment of the present disclosure;

FIG. 2 is a diagram illustrating a functional configuration of an information processing apparatus according to a first embodiment of the present disclosure;

FIG. 3 is a diagram illustrating a hardware configuration of the information processing apparatus shown in FIG. 2;

FIG. 4 is a flowchart of a display process executed by the information processing apparatus shown in FIG. 2;

FIG. 5 is a flowchart of a parallel display process included in the display process shown in FIG. 4;

FIG. 10A is a diagram illustrating an image captured by another display system when three users are using the display system;

FIG. 10B is a diagram illustrating images captured by other display systems when one of the display systems is used by two users and the other is used by a single user;

FIG. 10C is a diagram illustrating images captured by other display systems when each of the display systems is used by a single user;

FIG. 13 is a diagram illustrating a functional configuration of an information processing apparatus according to a second embodiment of the present disclosure;

DETAILED DESCRIPTION OF EMBODIMENTS

Figure 6:
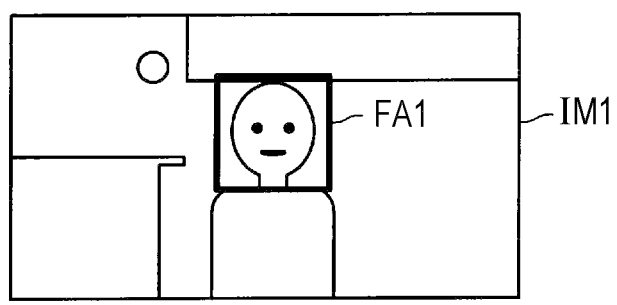
FIG. 6 is a diagram illustrating an image captured in another display system.

Embodiments of the present disclosure will be described with reference to the accompanying drawings. Note that, in this specification and the drawings, components having substantially the same functions are denoted by the same reference numerals so that redundant descriptions are avoided.

Note that a description will be made in the following order.
1. Display System
2. Functional Configuration of Information Processing Apparatus (First Embodiment)
3. Hardware Configuration of Information Processing Apparatus
4. Display Process
5. Examples
6. Functional Configuration of Information Processing Apparatus (Second Embodiment)

1. Display System

First, a display system according to an embodiment of the present disclosure will be described. FIG. 1 is a diagram illustrating a display system according to an embodiment. FIG. 1 is a front view of the display system viewed from the front.

In FIG. 1, a display system 100 includes a display device 102 and an image pickup device 104, for example.

The display device 102 is an example of a display device of the present disclosure, and displays still images or moving images in accordance with driving signals. For example, the display device 102 displays a still image or a moving image using liquid crystal. Note that the display device 102 may display a still image or a moving image using self-luminous display device such as an organic EL (Electroluminescence).

The image pickup device 104 which is an example of an image pickup device according to the present disclosure is disposed in an upper center portion of the display device 102 and captures a subject located in a display direction of the display device 102. The image pickup device 104 may take still images or moving images using a CCD (Charge Coupled Device) image sensor or may take still images or moving images using a CMOS (Complementary Metal Oxide Semiconductor) image sensor.

Note that, although the image pickup device 104 is disposed in the upper center portion of the display device 102 in this embodiment, a location where the image pickup device 104 is disposed is not limited to the upper center portion of the display device 102. For example, the image pickup device 104 may be disposed in a lower center portion of the display device 102. Furthermore, although the single image pickup device 104 is disposed in this embodiment, the number of image pickup devices 104 is not limited to one. For example, two or more image pickup devices 104 may be disposed. Furthermore, although the display device 102 and the image pickup device 104 are integrally configured in this embodiment, the display device 102 and the image pickup device 104 may be separately configured.

Note that the display system 100 may include a sensor (not shown) which detects presence or absence of a user positioned in front of the display device 102 and a signal reception unit (not shown) capable of receiving a control signal through an infrared communication or a wireless communication from a remote controller (not shown). Furthermore, the sensor may detect a distance between the display device 102 and the user positioned in front of the display device 102.

The display device 102 of this embodiment may display content corresponding to a still image or a moving image and images captured by other information processing apparatuses 500 and 700 shown in FIG. 2 in parallel which will be described hereinafter. For example, the display device 102 may display content corresponding to a still image or a moving image in a content display region in a display screen and display images captured by the other information processing apparatuses 500 and 700 in a display region for displaying images captured by the information processing apparatuses 500 and 700 in the display screen. The content display region is an example of a first display region according to the present disclosure. The display region for displaying images captured by the other information processing apparatuses 500 and 700 is an example of a second display region according to the present disclosure.

Furthermore, the image pickup device 104 of this embodiment may capture a still image and a moving image regarding a user A who is watching the display screen of the display device 102 shown in FIG. 2.

2. Functional Configuration of Information Processing Apparatus (First Embodiment)

Next, a functional configuration of an information processing apparatus according to a first embodiment of the present disclosure will be described. FIG. 2 is a diagram illustrating a functional configuration of the information processing apparatus according to the first embodiment of the present disclosure. Note that, FIG. 2 includes a display system 100 which transmits a captured image to an information processing apparatus 200 serving as the information processing apparatus according to this embodiment and which receives a signal for driving the display device 102 from the information processing apparatus 200 and a user A who uses the display system 100 and the information processing apparatus 200. Furthermore, FIG. 2 includes a communication network 800 to which the information processing apparatus 200 is connectable, a communication server 300 and other information processing apparatuses 500 and 700 which are connectable to the communication network 800, a display system 400 which transmits a captured image to the information processing apparatus 500 and which receives a signal from the information processing apparatus 500, users B and C who use the display system 400 and the information processing apparatus 500, a display system 600 which transmits a captured image to the information processing apparatus 700 and which receives a signal from the information processing apparatus 700, and a user D who uses the display system 600 and the information processing apparatus 700. The display systems 400 and 600 have the same configurations as the display system 100, and therefore, detailed descriptions thereof are omitted. Furthermore, the information processing apparatuses 500 and 700 have the same configurations as the information processing apparatus 200, and therefore, detailed descriptions thereof are omitted. The information processing apparatuses 500 and 700 are examples of communication object apparatuses according to the present disclosure.

In FIG. 2, the information processing apparatus 200 includes an input unit 202, a detection unit 204, a head-count obtaining unit 206, a setting unit 208, a display image generation unit 210, a communication unit 212, an output unit 214, and a display controller 216.

The input unit 202 receives a captured image which is generated by the image pickup device 104 through image capturing. The captured image generated by the image pickup device 104 through the image capturing is an example of another captured image according to the present disclosure. Then, the input unit 202 transmits the received (input) captured image to the communication unit 212. Note that the input unit 202 may transmit the received captured image to the detection unit 204 and the display image generation unit 210. Furthermore, the input unit 202 accepts an input for a setting of a display ratio of a display region for content to a display region for captured images supplied from the information processing apparatuses 500 and 700 in a display screen of the display device 102 performed by the user A, for example. Note that the input unit 202 may accept an input for a setting of a display ratio of a display region for content to a display region for captured images supplied from the information processing apparatus 200, 500, and 700 in the display screen of the display device 102 performed by the user A. Then, the input unit 202 transmits information on the received input for a setting of a display ratio to the setting unit 208. The display region for captured images supplied from the information processing apparatuses 200, 500, and 700 is an example of a second display region according to the present disclosure.

The detection unit 204 which is an example of a detection unit according to the present disclosure receives captured images which are supplied from the information processing apparatuses 500 and 700 and which are received by the communication unit 212 and detects face regions including faces of the users B, C, and D in the received captured images. Then, the detection unit 204 transmits information on the face regions as results of the detection to the head-count obtaining unit 206 and the display image generation unit 210. Note that the detection unit 204 may receive a captured image supplied from the input unit 202 and detect a face region including a face of the user A in the received captured image. Then, the detection unit 204 may transmit information on the face region including the face of the user A as a result of the detection to the head-count obtaining unit 206, the display image generation unit 210, and the communication unit 212. A technique disclosed in Japanese Unexamined Patent Application Publication No. 2007-65766 and a technique disclosed in Japanese Unexamined Patent Application Publication No. 2005-44330 may be used for the detection of a face region performed on a captured image by the detection unit 204. Hereinafter, the detection of a face region will be briefly described.

To detect the face of the user A in the captured image, for example, a face position, a face size, and a face direction are individually detected in the received captured image. When the face position and the face size are detected, a portion corresponding to a face image may be extracted from the image. Then, in accordance with the extracted face image and information on the face direction, characteristic portions of the face (face feature positions) such as eye blows, eyes, a nose, and a mouth are detected. A method referred to as an AAM (Active Appearance Models) method, for example, may be used for the detection of the face feature positions.

After the face feature positions are detected, local feature values of the detected face feature positions are individually calculated. When the local feature values are calculated and the calculated local feature values are stored along with the face image, a face is identified in the image captured by the image pickup device 104. A technique disclosed in Japanese Unexamined Patent Application Publication No. 2007-65766 or a technique disclosed in Japanese Unexamined Patent Application Publication No. 2005-44330 may be used as a method for identifying a face, and therefore, a detailed description thereof is omitted here. Furthermore, in accordance with the face image and the face feature positions, a gender and an age of a face included in the received captured image may be determined. Moreover, by storing information on faces in advance, the face of the user included in the received captured image may be obtained from among the stored faces so as to specify the user.

The head-count obtaining unit 206 which is an example of an obtaining unit according to the present disclosure receives information on the face regions including the faces of the users B, C, and D detected by the detection unit 204. Then, the head-count obtaining unit 206 obtains the number of users who use the information processing apparatuses 500 and 700 in accordance with the received information on the face regions. Thereafter, the head-count obtaining unit 206 transmits a result of the obtainment of the number of users who use the information processing apparatuses 500 and 700 to the display image generation unit 210. Note that the head-count obtaining unit 206 may receive information on a face region including the face of the user A detected by the detection unit 204 and obtain the number of users who use the information processing apparatus 200 in accordance with received information on the face region including the face of the user A. Then, the head-count obtaining unit 206 may transmit a result of the obtainment of the number of users who use the information processing apparatus 200 to the display image generation unit 210 and the display controller 216. Furthermore, when the communication unit 212 receives the information on the face regions including the faces of the users B and C detected in the image captured using the display system 400 and information on the face region including the face of the user D detected in the image captured using the display system 600, the head-count obtaining unit 206 may receive the information on the face regions and obtain the number of users who use the information processing apparatuses 500 and 700 in accordance with the received information on the face regions. In this case, the detection unit 204 described above may not detect the face regions including the faces of the users B, C and D in the captured images supplied from the information processing apparatuses 500 and 700.

The setting unit 208 which is an example of a setting unit according to the present disclosure receives information on the input for the setting of the display ratio from the input unit 202 and sets the display region for content and a display region for captured images supplied from the information processing apparatuses 500 and 700 in the display screen of the display device 102 in accordance with the received information on the input for the setting of the display ratio. Furthermore, the setting unit 208 may set a display region for content and a display region for captured images supplied from the information processing apparatuses 200, 500, and 700 in the display screen of the display device 102 in accordance with the received information on the input for the setting of the display ratio. Then, the setting unit 208 transmits information on the set display region for captured images to the display image generation unit 210 and the display controller 216 and transmits information on the set display region for content to the display controller 216. For example, the setting unit 208 sets a size of the display region for content and a size of the display region for captured images supplied from the information processing apparatuses 500 and 700 in the display screen of the display device 102 and transmits information on the set size of the display region for content and information on the set size of the display region for captured images.

The display image generation unit 210 which is an example of a generation unit according to the present disclosure receives information on the face regions including the faces of the users B, C, and D from the detection unit 204, receives the result of the obtainment of the number of users who use the information processing apparatuses 500 and 700 from the head-count obtaining unit 206, receives the information on the display region for captured images supplied from the information processing apparatuses 500 and 700 from the setting unit 208, and receives the image captured using the display system 400 and the image captured using the display system 600 which are received by the communication unit 212. Then, in accordance with the received information on the face regions including the faces of the users B, and C and D, the received result of the obtainment of the number of users who use the information processing apparatuses 500 and 700, and the information on the display region for captured images supplied from the information processing apparatuses 500 and 700, the display image generation unit 210 generates a display image to be displayed in the display region for captured images supplied from the information processing apparatuses 500 and 700 included in the display screen of the display device 102 using the image captured by the display system 400 and the image captured by the display system 600. Thereafter, the display image generation unit 210 transmits the generated display image to the display controller 216.

For example, the display image generation unit 210 extracts a portion of the image captured by the display system 400 corresponding to one third of the display region for captured images such that at least face feature portions of the user B are included in the portion in accordance with the information on the face region including the face of the user B, the result of the obtainment of the number of users who use the information processing apparatuses 500 and 700, that is, information representing that the number of users is three, and the information on the display region for captured images supplied from the information processing apparatuses 500 and 700 such as information on the size of the display region. Furthermore, the display image generation unit 210 extracts a portion of the image captured by the display system 400 corresponding to one third of the display region for captured images such that at least face feature portions of the user C are included in the portion in accordance with the information on the face region including the face of the user C, the information representing that the number of users who use the information processing apparatuses 500 and 700 is three, and the information on the size of the display region for captured images supplied from the information processing apparatuses 500 and 700. Moreover, the display image generation unit 210 extracts a portion of the image captured by the display system 600 corresponding to one third of the display region for captured images such that at least face feature portions of the user D are included in the portion in accordance with the information on the face region including the face of the user D, the information representing that the number of users who use the information processing apparatuses 500 and 700 is three, and the information on the size of the display region for captured images supplied from the information processing apparatuses 500 and 700. Then, the display image generation unit 210 arranges the extracted captured images in the display region for captured images supplied from the information processing apparatuses 500 and 700 included in the display screen of the display device 102 such that the faces of the users who use the information processing apparatuses 500 and 700 are arranged in a horizontal direction, in a vertical direction, or in a matrix so that the display image described above is generated.

When receiving the image captured by the display system 100 from the input unit 202, receiving the information on the face region including the face of the user A and the information on the face regions including the faces of the users B, C, and D from the detection unit 204, receiving the result of the obtainment of the number of users who use the information processing apparatus 200 and the result of the obtainment of the number of users who use the information processing apparatuses 500 and 700 from the head-count obtaining unit 206, receiving the information on the display regions for captured images of the information processing apparatuses 200, 500, and 700 from the setting unit 208, and receiving the image captured by the display system 400 and the image captured by the display system 600 which are received by the communication unit 212, the display image generation unit 210 may generate a display image to be displayed in the display region for captured images supplied from the information processing apparatuses 200, 500, and 700 included in the display screen of the display device 102 using the image captured by the display system 100, the image captured by the display system 400, and the image captured by the display system 600 in accordance with the received information on the face region including the face of the user A, the received information on the face region including the faces of the users B and C, the received information on the face region including the face of the user D, the received result of the obtainment of the number of users who use the information processing apparatus 200, the received result of the obtainment of the number of users who use the information processing apparatuses 500 and 700, and the information on the display region for captured images supplied from the information processing apparatuses 200, 500, and 700.

In this case, the display image generation unit 210 extracts a portion of the image captured by the display system 100 corresponding to a quarter of the display region for captured images such that at least face feature portions of the user A are included in the portion in accordance with the information on the face region including the face of the user A, the result of the obtainment of the number of users who use the information processing apparatuses 200, 500, and 700, that is, information representing that the number of users is four, and the information on the display region for captured images supplied from the information processing apparatuses 200, 500, and 700 such as the information on the size of the display region. Furthermore, the display image generation unit 210 extracts a portion of the image captured by the display system 400 corresponding to a quarter of the display region for captured images such that at least face feature portions of the user B are included in the portion in accordance with the information on the face region including the face of the user B, the information representing that the number of users who use the information processing apparatuses 200, 500, and 700 is four, and the information on the size of the display region for the captured images supplied from the information processing apparatuses 500 and 700. Moreover, the display image generation unit 210 extracts a portion of the image captured by the display system 400 corresponding to a quarter of the display region for captured images such that at least face feature portions of the user C are included in the portion in accordance with the information on the face region including the face of the user C, the information representing that the number of users who use the information processing apparatuses 200, 500, and 700 is four, and the information on the size of the display region for captured images supplied from the information processing apparatuses 200, 500, and 700. Furthermore, the display image generation unit 210 extracts a portion of the image captured by the display system 600 corresponding to a quarter of the display region for captured images such that at least face feature portions of the user D are included in the portion in accordance with the information on the face region including the face of the user D, the information representing that the number of users who use the information processing apparatuses 200, 500, and 700 is four, and the information on the size of the display region for captured images supplied from the information processing apparatuses 200, 500, and 700. Then, the display image generation unit 210 arranges the extracted captured images in the display region for captured images supplied from the information processing apparatuses 200, 500, and 700 included in the display screen of the display device 102 such that the faces of the users who use the information processing apparatuses 200, 500, and 700 are arranged in the horizontal direction, in the vertical direction, or in a matrix to thereby generate the display image described above.

Note that, when the communication unit 212 receives the information on the face regions including the faces of the users B and C detected in the image captured by the display system 400 or the information on the face region including the face of the user D detected in the image captured by the display system 600, the display image generation unit 210 may receive the information on the face images and generate a display image in accordance with the information on the face regions received by the communication unit 212 instead of the information on the face regions detected by the detection unit 204.

Furthermore, the display image generation unit 210 may extract portions of the captured images such that invalid regions which are wasted regions are not included in the display image in accordance with the received information on the face regions to thereby generate the display image. Moreover, the display image generation unit 210 may extract portions of the captured images such that the same portions which display the same images are not included in the display image to thereby generate the display image. In addition, the display image generation unit 210 may generate a display image regarding a plurality of users as a single user when the users are positioned near one another in a captured image in accordance with received information on face regions.

The communication unit 212 which is an example of a reception unit according to the present disclosure receives an image captured using the display system 400 from the communication server 300 through the communication network 800. Furthermore, the communication unit 212 receives an image captured by the display system 600 from the communication server 300 through the communication network 800.

Note that the communication unit 212 may directly receive an image captured by the display system 400 from the information processing apparatus 500 through the communication network 800. Similarly, the communication unit 212 may directly receive an image captured by the display system 600 from the information processing apparatus 700 through the communication network 800.

Moreover, the communication unit 212 may receive a captured image supplied from the input unit 202 and transmit the received captured image to the communication server 300 through the communication network 800. Furthermore, the communication unit 212 may receive the information on the face region including the user A detected in the image captured using the display system 100 by the detection unit 204 and transmit the received information on the face region to the communication server 300 through the communication network 800. Note that the communication unit 212 may directly transmit the received captured image and the information on the face region to the information processing apparatuses 500 and 700 through the communication network 800.

Furthermore, the communication unit 212 may receive the information on the face regions including the faces of the users B and C detected in the image captured using the display system 400 and the information on the face region including the face of the user D detected in the image captured using the display system 600 from the communication server 300 through the communication network 800. Note that the communication unit 212 may directly receive the information on the face regions including the faces of the users B and C detected in the image captured using the display system 400 from the information processing apparatus 500 through the communication network 800. Similarly, the communication unit 212 may directly receive the information on the face region including the face of the user D detected in the image captured using the display system 600 from the information processing apparatus 700 through the communication network 800.

The output unit 214 receives a signal used to drive the display device 102 from the display controller 216 and transmits the received signal to the display device 102.

The display controller 216 which is an example of a controller according to the present disclosure receives information on the display region for content from the setting unit 208 and the information on the display region for captured images supplied from the information processing apparatuses 500 and 700. Furthermore, the display controller 216 receives content corresponding to a still image or a moving image. Then, the display controller 216 transmits a signal for displaying the display image generated by the display image generation unit 210 in the display region for captured images supplied from the information processing apparatuses 500 and 700 included in the display screen of the display device 102 to the output unit 214. Moreover, the display controller 216 transmits a signal for displaying content having a reduced image size in the display region for content in the display screen of the display device 102 to the output unit 214.

Note that, when receiving the information on the display region for content and the information on the display region for captured images supplied from the information processing apparatuses, 200, 500, and 700 from the setting unit 208 and receiving the display image from the display image generation unit 210, the display controller 216 may transmit to the output unit 214 a signal for displaying the display image generated by the display image generation unit 210 in the display region for captured images supplied from the information processing apparatuses 200, 500, and 700 included in the display screen of the display device 102.

3. Hardware Configuration of Information Processing Apparatus

Next, a hardware configuration of the information processing apparatus 200 shown in FIG. 2 will be described. FIG. 3 is a diagram illustrating a hardware configuration of the information processing apparatus 200 shown in FIG. 2.

In FIG. 3, the information processing apparatus 200 includes an MPU 230, a ROM 232, a RAM 234, a recording medium 236, an input/output interface 238, an operation input device 240, a display device 242, and a communication interface 244. Furthermore, in the information processing apparatus 200, the components are connected to one another through a bus 246 serving as a data transmission path.

The MPU 230 includes an MPU (Micro Processing Unit) and an integrated circuit in which a plurality of circuits are integrated to realize various functions such as image processing and functions as a controller (not shown) which controls the entire information processing apparatus 200. Furthermore, in the information processing apparatus 200, the MPU 230 functions as the detection unit 204, the head-count obtaining unit 206, the setting unit 208, the display image generation unit 210, and the display controller 216.

The ROM 232 stores programs and control data such as calculation parameters used by the MPU 230. The RAM 234 temporarily stores programs executed by the MPU 230, for example.

The recording medium 236 stores applications, for example. Here, examples of the recording medium 236 include a magnetic recording medium such as a hard disk and a nonvolatile memory such as an EEPROM (Electrically Erasable and Programmable Read Only Memory), a flash memory, an MRAM (Magnetoresistive Random Access Memory), an FeRAM (Ferroelectric Random Access Memory), or a PRAM (Phase change Random Access Memory). Furthermore, the information processing apparatus 200 may include a recording medium 236 which is detachable from the information processing apparatus 200.

The input/output interface 238 is connected to the operation input device 240 and the display device 242, for example. Furthermore, the input/output interface 238 functions as the input unit 202 and the output unit 214. The operation input device 240 functions as an operation unit (not shown), and the display device 242 functions as a display unit 254 which will be described with reference to FIG. 13. Here, examples of the input/output interface 238 include a USB (Universal Serial Bus) terminal, a DVI (Digital Visual Interface) terminal, an HDMI (High-Definition Multimedia Interface) terminal, and various processing circuits. Furthermore, the operation input device 240 is disposed on the information processing apparatus 200, for example, and is connected to the input/output interface 238 inside the information processing apparatus 200. Examples of the operation input device 240 include a button, a direction key, a rotatable selector such as a jog dial, and a combination thereof. Furthermore, the display device 242 is disposed on the information processing apparatus 200, for example, and is connected to the input/output interface 238 inside the information processing apparatus 200. Examples of the display device 242 include an LCD (Liquid Crystal Display) and an organic EL (ElectroLuminescence) display (which is also referred to as an OLED (Organic Light Emitting Diode) display). Note that it is apparent that the input/output interface 238 may be connected to an operation input device (for example, a keyboard and a mouse) serving as an external apparatus of the information processing apparatus 200 and an external device such as a display device (for example, an external display device such as the display device 102) and an image pickup device (for example, the image pickup device 104). Furthermore, the display device 242 may be a device which is capable of performing display and which allows a user's operation, such as a touch screen.

The communication interface 244 which is a communication unit included in the information processing apparatus 200 functions as the communication unit 212 which performs communication with an external apparatuses including the server 300 and the information processing apparatuses 500 and 700 through the network 800 (or directly) in a wireless/wired manner. Note that examples of the communication interface 244 include a combination of a communication antenna and an RF circuit (wireless communication), a combination of an IEEE802.15.1 port and a transmission/reception circuit (wireless communication), a combination of an IEEE802.11b port and a transmission/reception circuit (wireless communication), and a combination of a LAN terminal and a transmission/reception circuit (wired communication).

Note that the hardware configuration of the information processing apparatus 200 according to this embodiment is not limited to the configuration shown in FIG. 3. For example, the information processing apparatus 200 may include an audio output device which serves as an audio output unit (not shown) and which includes a DSP (Digital Signal Processor), an amplifier, and a speaker.

Furthermore, the information processing apparatus 200 may include an image pickup device which serves as an image pickup unit 252 shown in FIG. 13 and which includes a lens-and-image pickup element, and a signal processing circuit. In this case, the information processing apparatus 200 may process a captured image generated by itself. Here, the lens-and-image pickup element includes an optical lens and an image sensor including a plurality of image pickup elements such as CCD (Charge Coupled Device) sensors or CMOS (Complementary Metal Oxide Semiconductor) sensors. The signal processing circuit which includes an AGC (Automatic Gain Control) circuit and an ADC (Analog to Digital Converter) converts analog signals generated by the image pickup elements into digital signals (image data) and performs various signal processes. Examples of the signal processes performed by the signal processing circuit include a White Balance correction process, an interpolation process, a tone correction process, a gamma correction process, an YCbCr conversion process, an edge emphasizing process, and a coating process.

Moreover, the information processing apparatus 200 may not include the operation input device 240 and the display device 242 shown in FIG. 3, for example.

4. Display Process

Next, a display process executed by the information processing apparatus 200 shown in FIG. 2 will be described. FIG. 4 is a flowchart of the display process executed by the information processing apparatus 200 shown in FIG. 2.

In FIG. 4, first, when the user A inputs an instruction for displaying content desired by the user A in the display device 102 using the information processing apparatus 200, the display controller 216 transmits a signal for displaying the content desired by the user A in the display screen of the display device 102 to the output unit 214 which transmits the received signal to the display device 102. By this, the content desired by the user A is displayed in the display screen of the display device 102 (step S100).

Next, when the user A inputs an instruction for connection to the users B, C, and D through the network using the information processing apparatus 200, the communication unit 212 enters a state in which the communication unit 212 may communicate with the communication server 300 through the communication network 800 (in step S102). Note that, in step S102, the communication unit 212 may enter a state in which the communication unit 212 may directly communicate with the information processing apparatuses 500 and 700 through the communication network 800.

Next, the communication unit 212 transmits a captured image which is generated through image capturing performed by the image pickup device 104 included in the display system 100 and which is received through the input unit 202 to the communication server 300 through the communication network 800 (in step S104). Note that, in step S104, the communication unit 212 may transmit information on a face region including the face of the user A transmitted from the detection unit 204 to the communication server 300 through the communication network 800. Furthermore, in step S104, the communication unit 212 may directly transmit the captured image or the information on the face region to the information processing apparatuses 500 and 700 through the communication network 800.

Subsequently, the communication unit 212 receives an image which is captured by the display system 400 and which is transmitted from the information processing apparatus 500 through the communication server 300. Furthermore, the communication unit 212 receives an image which is captured by the display system 600 and which is transmitted from the information processing apparatus 700 through the communication server 300 (in step S106). Note that, in step S106, the information on the face regions including the faces of the users B and C detected in the image which is captured by the display system 400 and which is transmitted from the information processing apparatus 500 and the information on the face region including the face of the user D detected in the image which is captured by the display system 600 and which is transmitted from the information processing apparatus 700 may be received from the communication server 300. Furthermore, in step S106, the communication unit 212 may directly receive the captured images and the information on the face regions from the information processing apparatuses 500 and 700 through the communication network 800.

Subsequently, the information processing apparatus 200 executes a parallel display process which will be described with reference to FIG. 5 (in step S108) so that the content desired by the user A and the captured images supplied from the information processing apparatuses 500 and 700 are displayed in parallel in the display screen of the display device 102, and thereafter, the process is terminated.

FIG. 5 is a flowchart of the parallel display process performed in step S108 included in the display process shown in FIG. 4.

In FIG. 5, first, the head-count obtaining unit 206 obtains the number of users who use the information processing apparatuses 500 and 700 in accordance with the information on the face regions including the faces of the users B, C, and D detected by the detection unit 204 (in step S200). Note that, in step S200, the head-count obtaining unit 206 may obtain the number of users who use the information processing apparatus 200 in accordance with the information on the face region including the face of the user A detected by the detection unit 204. Furthermore, in step S200, when the communication unit 212 receives the information on the face regions including the faces of the users B and C detected in the image captured by the display system 400 and the information on the face region including the face of the user D detected in the image captured by the display system 600, the number of users who use the information processing apparatuses 500 and 700 may be obtained in accordance with the information on the face regions.

Next, the setting unit 208 sets a display region for content and a display region for captured images supplied from the information processing apparatuses 500 and 700 in the display screen of the display device 102 in accordance with information on an input performed by the user A to set the display ratio of the display region for content to the display region for captured images supplied from the information processing apparatuses 500 and 700 in the display screen of the display device 102 (in step S202). Note that, in step S202, the setting unit 208 may set the display region for content and the display region for captured images supplied from the information processing apparatuses 200, 500, and 700 in the display screen of the display device 102 in accordance with the information on an input performed by the user to set the display ratio of the display region for content to the display region for captured images supplied from the information processing apparatuses 200, 500, and 700 in the display screen of the display device 102.

Subsequently, the display image generation unit 210 extracts portions of the image which is captured by the display system 400 and which is received by the communication unit 212 and a portion of the image which is captured by the display system 600 and which is received by the communication unit 212 in accordance with the information on the face regions including the faces of the users B, C, and D transmitted from the detection unit 204, a result of the obtainment of the number of users who use the information processing apparatuses 500 and 700 which is supplied from the head-count obtaining unit 206, and the information on the display region for captured images supplied from the information processing apparatuses 500 and 700 which is supplied from the setting unit 208 (in step S204), and generates a display image to be displayed in the display region for captured images supplied from the information processing apparatuses 500 and 700 in the display screen of the display device 102 (in step S206).

Note that, in step S204 and step S206, the display image generation unit 210 may extract a portion of the image which is captured by the display system 100, portions of the image captured by the display system 400, and a portion of the image captured by the display system 600 in accordance with the information on the face region including the face of the user A transmitted from the detection unit 204, the information on the face regions including the faces of the users B, C, and D transmitted from the detection unit 204, a result of the obtainment of the number of users who use the information processing apparatus 200 which is supplied from the head-count obtaining unit 206, a result of the obtainment of the number of users who use the information processing apparatuses 500 and 700 which is supplied from the head-count obtaining unit 206, and the information on the display region for captured images supplied from the information processing apparatuses 200, 500, and 700 which is supplied from the setting unit 208, and generate a display image to be displayed in the display region for captured images supplied from the information processing apparatuses 200, 500, and 700 in the display screen of the display device 102.

Furthermore, in step S204 and step S206, when the communication unit 212 receives the information on the face regions including the faces of the users B and C detected in the image captured by the display system 400 and the information on the face region including the face of the user D detected by in the image captured by the display system 600, the display image generation unit 210 may generate a display image in accordance with the information on the face regions supplied from the communication unit 212 instead of the information on the face regions detected by the detection unit 204.

Next, the display controller 216 transmits a signal for displaying the content which is desired by the user A and which has a reduced size in the display region for content included in the display screen of the display device 102 to the output unit 214 in accordance with the information on the display region for content supplied from the setting unit 208. By this, the content desired by the user A which corresponds to the image having the reduced size is displayed in the display region for content in the display screen of the display device 102 (in step S208).

Next, the display controller 216 transmits a signal for displaying the display image generated by the display image generation unit 210 in the display region for captured images supplied from the information processing apparatuses 500 and 700 included in the display screen of the display device 102 to the output unit 214 in accordance with the information on the display region for the captured images supplied from the information processing apparatuses 500 and 700 which is received from the setting unit 208. By this, in the display screen of the display device 102, the display image generated by the display image generation unit 210 is displayed in the display region for captured images, and accordingly, the content desired by the user A and the captured images supplied from the information processing apparatuses 500 and 700 are displayed in parallel (in step S210). Then, this process is terminated.

Note that, in step S210, the display controller 216 may transmit a signal for displaying the display image generated by the display image generation unit 210 in the display region for captured images supplied from the information processing apparatuses 200, 500, and 700 included in the display screen of the display device 102 to the output unit 214 in accordance with the information on the display region for captured images supplied from the information processing apparatuses 200, 500, and 700 which is supplied from the setting unit 208. In this case, in the display screen of the display device 102, the display image generated by the display image generation unit 210 is displayed in the display region for captured image, and accordingly, the content desired by the user A and the captured images supplied from the information processing apparatuses 200, 500, and 700 are displayed in parallel.

According to the display process shown in FIG. 4, in the display screen of the display device 102, the display image generated by the display image generation unit 210 is displayed in the display region for captured images, and the content desired by the user A which corresponds to the image having the reduced size is displayed in the display region for content. The display image to be displayed in the display region for captured image is generated by extracting portions of the captured images in accordance with the information on the face regions, the result of the obtainment of the number of users, and the information on the display region for captured images such as information on a size of the display region. Therefore, when the size of the display region for captured images is small, the display image to be displayed in the display region for captured images is obtained by removing portions in the captured images which are wasted portions to identify the users, that is, obtained by removing large portions of backgrounds of the captured images, for example. Therefore, since portions of the captured images which are significant portions to identify the users such as portions of the captured images including face feature portions of the users are displayed in the display region for captured images even when the size of the display region for captured images is small, it is not difficult to identify the users. Furthermore, image quality of the display image is not deteriorated. Furthermore, since the image size of the content to be displayed in the content display region is reduced, it is unlikely that a portion of the content is hidden due to the display of the display image. Accordingly, the display of the content and the display of the captured images are appropriately performed in parallel.

5. Examples

Next, examples of the present disclosure will be described. FIG. 6 and FIGS. 7A to 7D are diagrams for explanation of a first example of the present disclosure. In the first example, a case where content desired by a user who uses the display system 100 and an image captured by the display system 400 are displayed in parallel in the display screen of the display device 102 shown in FIG. 2 will be described. Note that, in this first example, a case where a single user uses the display system 400 will be described.

FIG. 6 is a diagram illustrating an image captured by the display system 400. In FIG. 6, an image IM1 captured by the display system 400 is transmitted to the detection unit 204 included in the information processing apparatus 200 as described above, and the detection unit 204 detects a face region FA1 including a face of the user who uses the display system 400.

FIGS. 7A to 7D are diagrams illustrating content and a captured image supplied from the information processing apparatus 500 which are displayed in parallel in the display screen of the display device 102.

Figure 7A:
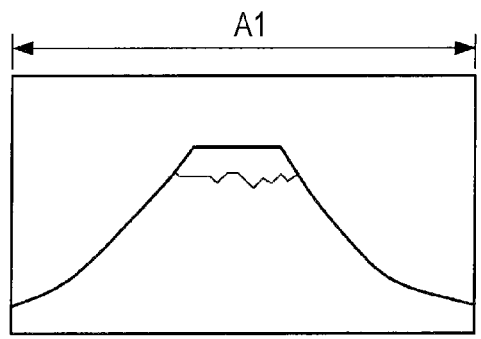
FIGS. 7A to 7D are diagrams illustrating content and captured images supplied from another information processing apparatus which are displayed in parallel in a display screen of a display device.
Figure 7B:
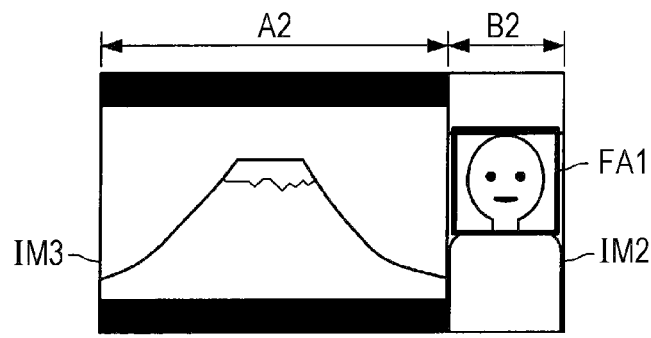
Figure 7C:
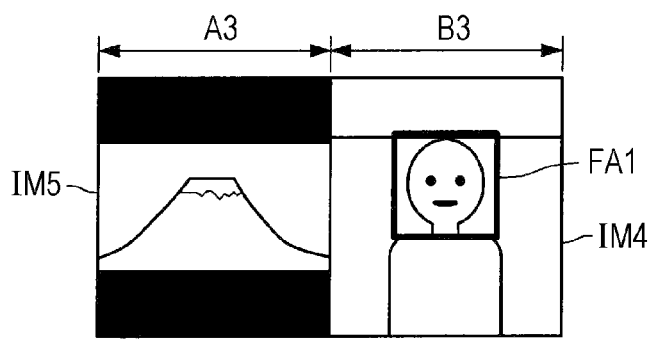
Figure 7D:
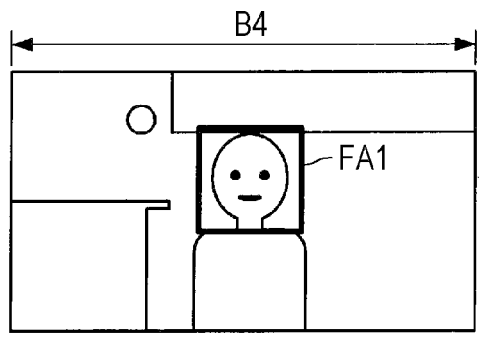

FIG. 7A shows a case where a display ratio of a display region for content to a display region for captured images supplied from the information processing apparatus 500 which is obtained through an input for setting of the display ratio of the display region for content to the display region for captured images is A1:B1 (B1=0). FIG. 7B shows a case where a display ratio of the display region for content to the display region for captured images is A2:B2 (B2<A2). FIG. 7C shows a case where a display ratio of the display region for content to the display region for captured images is A3:B3 (B3=A3). FIG. 7D shows a case where a display ratio of the display region for content to the display region for captured images is A4:B4 (A4=0).

As shown in FIGS. 7B and 7C, in the display screen of the display device 102, a display image IM2 or IM4 which is generated by extracting a portion of the image IM1 is displayed in the display region for captured images and content IM3 or IM5 which is desired by the user who uses the display system 100 and which corresponds to an image having a reduced size is displayed in the display region for content. By this, the user who uses the display system 100 may view the content IM3 or IM5 which is not partially hidden and easily identify the user who uses the display system 400 and whose face is included in the captured image.

FIG. 8A and FIGS. 9A to 9D are diagrams illustrating a second example of the present disclosure. In the second example, a case where content desired by a user who uses the display system 100 and an image captured by the display system 400 are displayed in parallel in the display screen of the display device 102 shown in FIG. 2 will be described. Note that, in the second example, a case where two users use the display system 400 will be described.

Figure 8A:
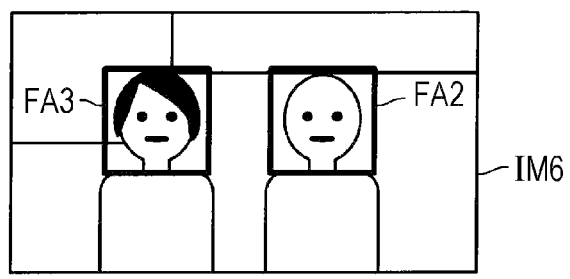
FIG. 8A is a diagram illustrating an image captured by another display system when two users are using the display system.

FIG. 8A is a diagram illustrating an image captured by the display system 400 when two users use the display system 400. In FIG. 8A, an image IM6 captured by the display system 400 is supplied to the detection unit 204 included in the information processing apparatus 200 as described above, and the detection unit 204 detects face regions FA2 and FA3 individually including faces of the two users who use the display system 400.

FIGS. 9A to 9D are diagrams illustrating content and a captured image supplied from the information processing apparatus 500 which are displayed in parallel in the display screen of the display device 102.

Figure 9A:
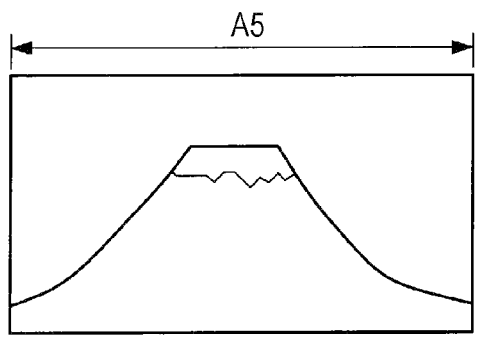
FIGS. 9A to 9D are diagrams illustrating content and a captured image supplied from another information processing apparatus which are displayed in parallel in the display screen of the display device.
Figure 9B:
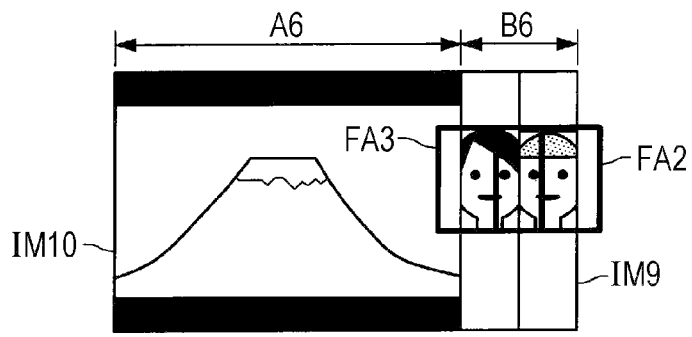
Figure 9C:
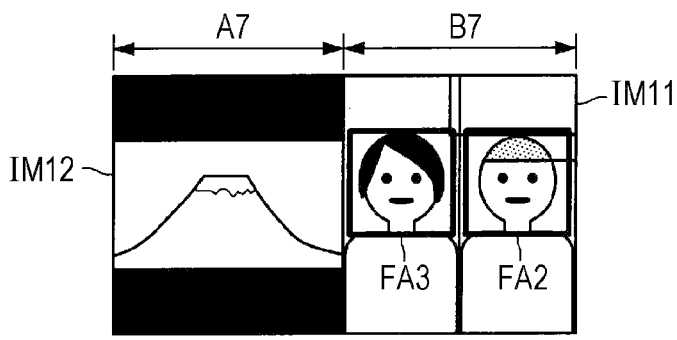
Figure 9D:
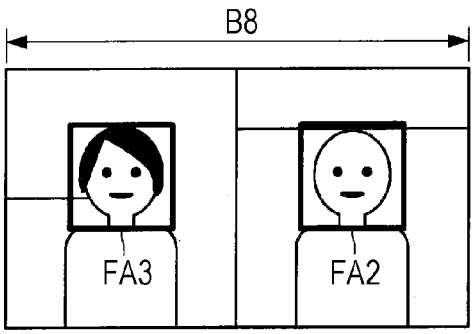

FIG. 9A shows a case where a display ratio of the display region for content to the display region for captured images supplied from the information processing apparatus 500 which is obtained through an input for setting of the display ratio of the display region for content to the display region for captured images is A5:B5 (B5=0). FIG. 9B shows a case where a display ratio of the display region for content to the display region for captured images is A6:B6 (B6<A6). FIG. 9C shows a case where a display ratio of the display region for content to the display region for captured images is A7:B7 (B7=A7). FIG. 9D shows a case where a display ratio of the display region for content to the display region for captured images is A8:B8 (A8=0).

As shown in FIGS. 9B and 9C, in the display screen of the display device 102, a display image IM9 or IM11 which is generated by extracting a portion of the image IM6 is displayed in the display region for captured images and content IM10 or IM12 which is desired by the user who uses the display system 100 and which corresponds to an image having a reduced size is displayed in the display region for content. By this, the user who uses the display system 100 may view the content IM10 or IM12 which is not partially hidden and easily identify the two users who use the display system 400 and whose faces are included in the captured image.

Figure 8B:
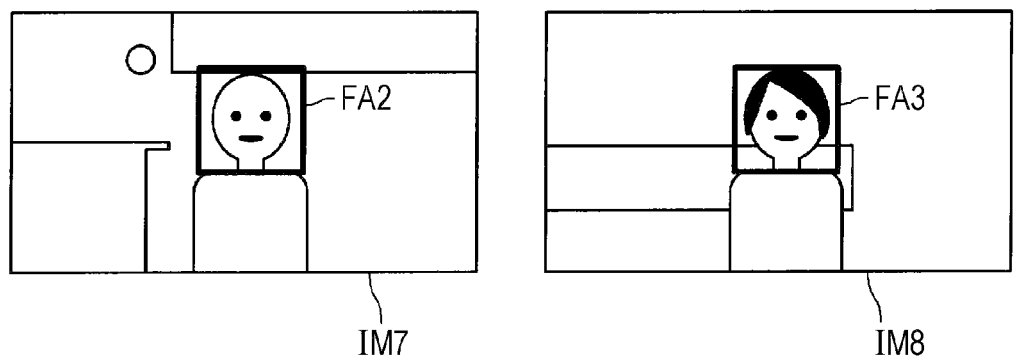
FIG. 8B is a diagram illustrating images captured by other display systems when each of the display systems is used by a single user.

Note that, as shown in FIG. 8B, also in a case where, when a single user uses the display system 400 and a single user uses the display system 600, the content desired by the user who uses the display system 100 and images IM7 and IM8 captured by the display systems 400 and 600, respectively, are displayed in parallel, the content desired by the user and the images captured by the display systems 400 and 600 may be displayed in parallel in the display screen of the display device 102 as shown in FIGS. 9A to 9D (specifically, FIGS. 9B and 9C).

FIG. 10A and FIGS. 11A to 11D are diagrams illustrating a third example of the present disclosure. Note that frames representing face regions are omitted in FIG. 10A and the following drawings. In the third example, a case where content desired by a user who uses the display system 100 and an image captured by the display system 400 are displayed in parallel in the display screen of the display device 102 shown in FIG. 2 will be described. Note that a case where three users use the display system 400 will be described in the third example.

FIG. 10A is a diagram illustrating an image captured by the display system 400 when three users use the display system 400. In FIG. 10A, an image IM13 captured by the display system 400 is transmitted to the detection unit 204 included in the information processing apparatus 200 as described above, and the detection unit 204 detects face regions (not shown) individually including faces of the three users who use the display system 400.

FIGS. 11A to 11D are diagrams illustrating the content and an image captured by the information processing apparatus 500 which are displayed in parallel in the display screen of the display device 102.

Figure 11A:
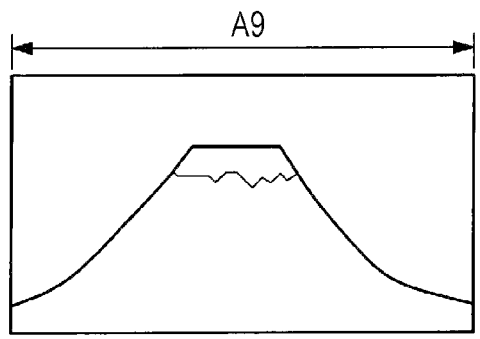
FIGS. 11A to 11D are diagrams illustrating content and a captured image supplied from another information processing apparatus which are displayed in parallel in the display screen of the display device.
Figure 11B:
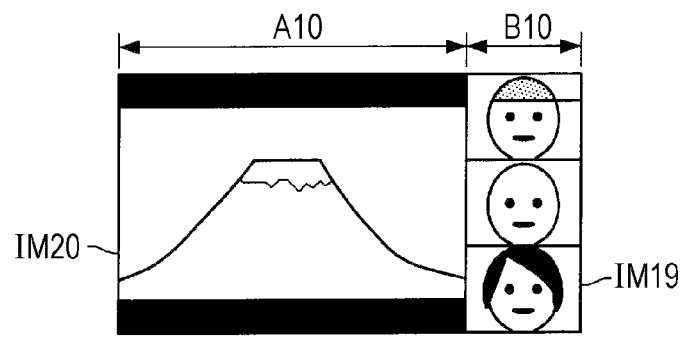
Figure 11C:
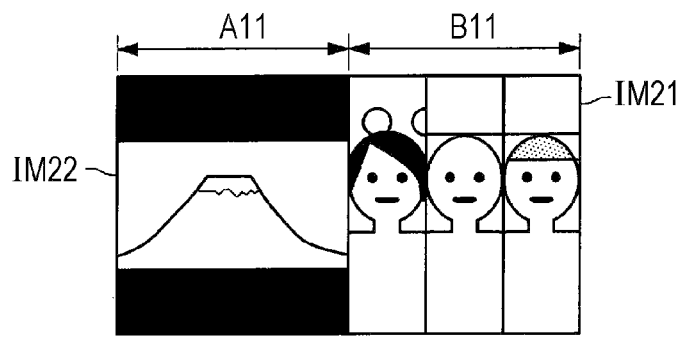
Figure 11D:
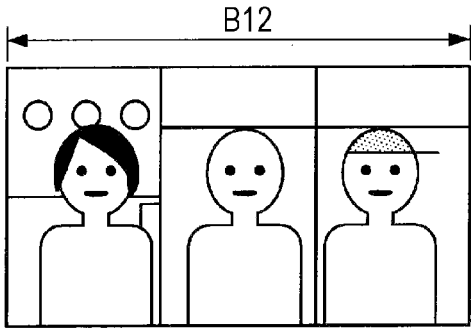
Figure 12A:
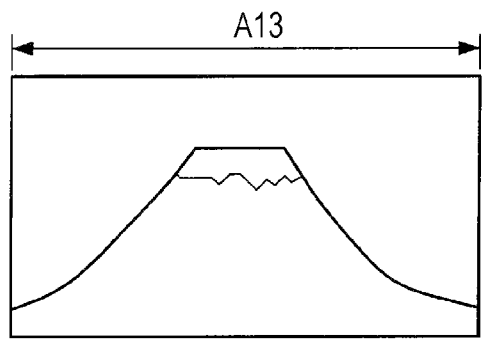
FIGS. 12A to 12D are diagrams illustrating content and a captured image supplied from another information processing apparatus which are displayed in parallel in the display screen of the display device.
Figure 12B:
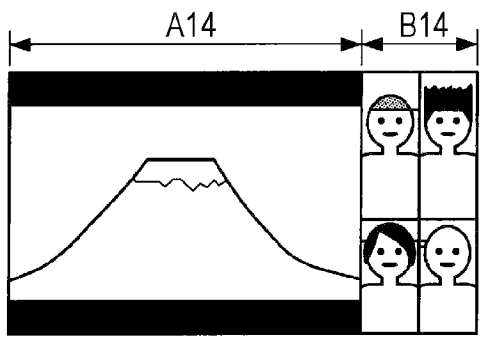
Figure 12C:
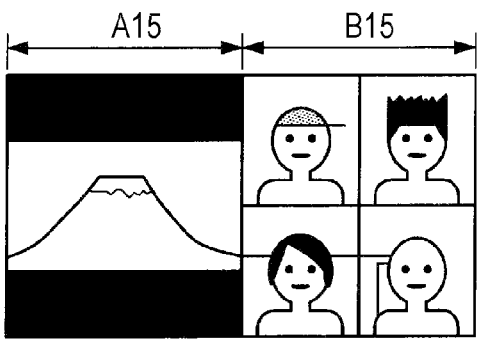
Figure 12D:
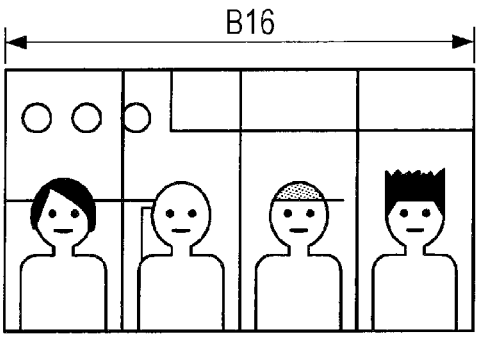

FIG. 11A shows a case where a display ratio of a display region for content to a display region for captured images supplied from the information processing apparatus 500 which is obtained through an input for setting of the display ratio of the display region for content to the display region for captured images is A9:B9 (B9=0). FIG. 11B shows a case where a display ratio of the display region for content to the display region for captured images is A10:B10 (B10<A10). FIG. 11C shows a case where a display ratio of the display region for content to the display region for captured images is A11:B11 (B11=A11). FIG. 11D shows a case where a display ratio of the display region for content to the display region for captured images is A12:B12 (A12=0).

As shown in FIGS. 11B and 11C, in the display screen of the display device 102, a display image IM19 or IM21 which is generated by extracting a portion of the image IM13 is displayed in the display region for captured images and content IM20 or IM22 which is desired by the user who uses the display system 100 and which corresponds to an image having a reduced size is displayed in the display region for content. By this, the user who uses the display system 100 may view the content IM20 or IM22 which is not partially hidden and easily identify the three users who use the display system 400 and whose faces are included in the captured image.

Note that, even in a case where two users use the display system 400 and a single user uses the display system 600 as shown in FIG. 10B, the content desired by the user who uses the display system 100 and images IM14 and IM15 captured by the display systems 400 and 600 may be displayed in parallel in the display screen included in the display device 102 as shown in FIGS. 11A to 11D (specifically, FIGS. 11B and 11C). Similarly, even in a case where a single user uses the display system 400, a single user uses the display system 600, and a single user uses another display system (not shown) as shown in FIG. 10C, the content desired by the user who uses the display system 100 and images IM16, IM17, IM18 captured by the display systems 400 and 600 and the other display system may be displayed in parallel in the display screen included in the display device 102 as shown in FIGS. 11A to 11D (specifically, FIGS. 11B and 11C).

Furthermore, similarly, as shown in FIGS. 12A to 12D (specifically, FIGS. 12B and 12C), even when four users use the display system 400 and other systems, the content desired by the user who use the display system 100 and images (not shown) captured by the display system 400 and the other systems may be displayed in parallel in the display screen included in the display device 102.

Figure 14A:
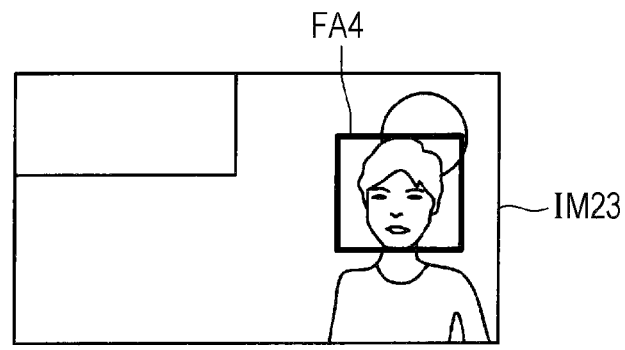
FIGS. 14A to 14C are diagrams illustrating a fourth embodiment of the present disclosure.
Figure 14B:
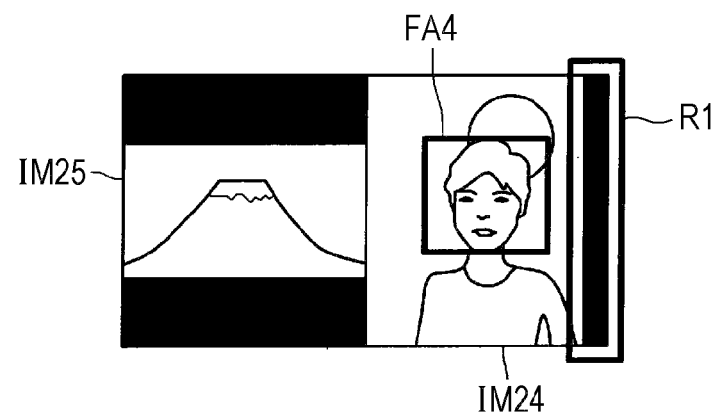
Figure 14C:
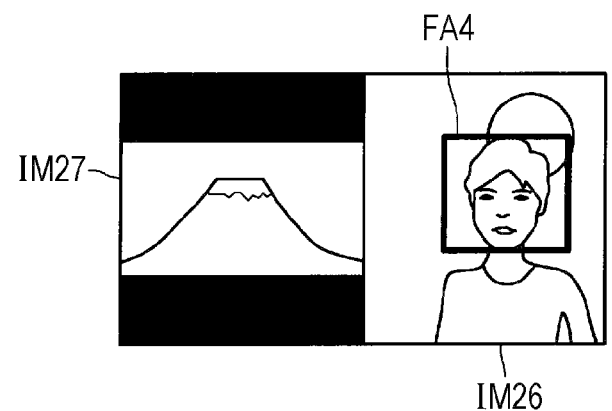

FIGS. 14A to 14C are diagrams illustrating a fourth example according to the present disclosure. In the fourth example, a case where content desired by the user who uses the display system 100 and an image captured by the display system 400 are displayed in parallel in the display screen of the display device 102 shown in FIG. 2 will be described. Note that, in the fourth example, a case where a single user uses the display system 400 and the user is included in an end portion of an image captured by the display system 400 will be described.

FIG. 14A is a diagram illustrating the image captured by the display system 400. In FIG. 14A, an image IM23 captured by the display system 400 is transmitted to the detection unit 204 included in the information processing apparatus 200 as described above, and the detection unit 204 detects a face region FA4 including a face of the user who uses the display system 400.

FIGS. 14B and 14C are diagrams illustrating the content and the captured image supplied from the information processing apparatus 500 which are displayed in parallel in the display screen included in the display device 102.

As shown in FIG. 14B, a display image IM24 generated by extracting a portion of the captured image IM23 is displayed in a display region for captured images and content IM25 which is desired by the user who uses the display system 100 and which has a reduced image size is displayed in a display region for content.

As shown in FIG. 14B, when the user is included in the end portion of the captured image and the display image IM 24 is generated by extracting a portion of the captured image IM23 including the face region FA4 as a center, the display image IM 24 displayed in the display region for captured images includes an invalid region R1 which is a wasted region.

Therefore, in the fourth example, when the user is included in the end portion of the captured image, the portion of the captured image IM23 is extracted so that the invalid region R1 is not displayed in the display region for captured images whereby a display image IM26 is generated. For example, when the user is included in a right end portion of the captured image as shown in FIG. 14A, a portion of the captured image IM23 is extracted using a right edge of the captured image IM23 as a reference so that the display image IM26 is generated. In this case, as shown in FIG. 14C, the display image IM26 which does not include the invalid region R1 is displayed in the display region for captured images and content IM27 which is desired by the user who uses the display system 100 and which has a reduced image size is displayed in the display region for content in the display screen of the display device 102. Accordingly, the user who uses the display system 100 may be prevented from having a feeling of strangeness and a discomfort feeling.

FIGS. 15A to 15D are diagrams illustrating a fifth example according to the present disclosure. In the fifth example, a case where content desired by the user who uses the display system 100 and an image captured by the display system 400 are displayed in parallel in the display screen of the display device 102 shown in FIG. 2 will be described. Note that, in the fifth example, a case where two users use the display system 400 and the two users are positioned close to each other in an image captured by the display system 400 will be described.

Figure 15A:
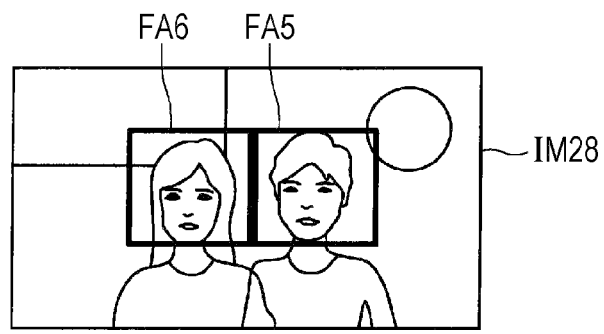
FIGS. 15A to 15D are diagrams illustrating a fifth embodiment of the present disclosure.

FIG. 15A is a diagram illustrating an image captured by the display system 400 when two users use the display system 400. In FIG. 15A, an image IM28 captured by the display system 400 is transmitted to the detection unit 204 included in the information processing apparatus 200 as described above, and the detection unit 204 detects face regions FA5 and FA6 individually including faces of the two users who use the display system 400.

Figure 15B:
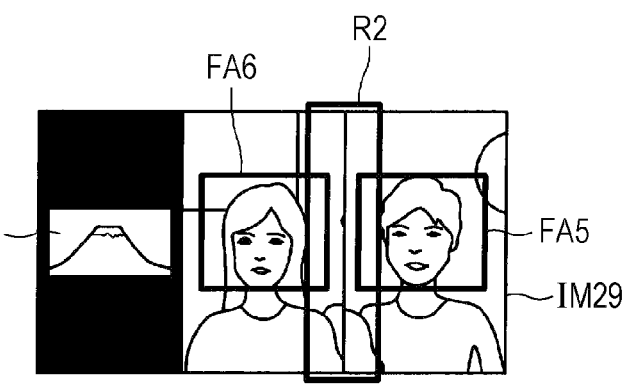
Figure 15C:
Figure 15D:

FIGS. 15B to 15D are diagrams illustrating the content and the captured image supplied from the information processing apparatus 500 which are displayed in parallel in the display screen of the display device 102.

As shown in FIG. 15B, in the display screen of the display device 102, a display image IM29 generated by extracting portions of the captured image IM28 is displayed in a display region for captured images and content IM30 which is desired by the user who uses the display system 100 and which has a reduced image size is displayed in a display region for content.

As shown in FIG. 15B, in a case where the two users are positioned close to each other in the captured image, when the display image IM29 is generated by extracting portions of the captured image IM28 using the face regions FA5 and FA6 as centers, the display image IM29 includes an overlapping region R2 which includes the same images in the display region for captured images.

Therefore, in the fifth example, when the two users are positioned close to each other in the captured image, a display image IM31 is generated by extracting portions of the captured images IM28 such that the overlapping region R2 is not displayed in the display region for captured images. In this case, as shown in FIG. 15C, the display image IM31 which does not include the overlapping region R2 is displayed in the display region for captured images and content IM32 which is desired by the user who uses the display system 100 and which has a reduced image size is displayed in the display region for content in the display screen of the display device 102. Accordingly, the user who uses the display system 100 may be prevented from having a feeling of strangeness and a discomfort feeling.

Furthermore, in the fifth example, when the two users are positioned close to each other in the captured image, it may be determined that a single user uses the display system 400 and a display image IM33 may be generated by extracting a portion of the captured image IM28 so that at least face feature portions of the two users are included in the display image IM33. Also in this case, as shown in FIG. 15D, the display image IM33 which does not include the overlapping region R2 is displayed in the display region for captured images and content IM34 which is desired by the user who uses the display system 100 and which has a reduced image size is displayed in the display region for content in the display screen of the display device 102. The display image IM31 shown in FIG. 15C is generated by arranging two images, and on the other hand, the display image IM33 shown in FIG. 15D is a single image, that is, an image generated by integrating the two images. Accordingly, the user who uses the display system 100 may be prevented from having a feeling of strangeness and a discomfort feeling.

FIGS. 16A to 16F are diagrams illustrating a sixth example according to the present disclosure. In the sixth example, a setting of a region to be extracted from a captured image will be described. FIGS. 16A to 16F are diagrams illustrating a setting of a region to be extracted from a captured image.

Figure 16A:
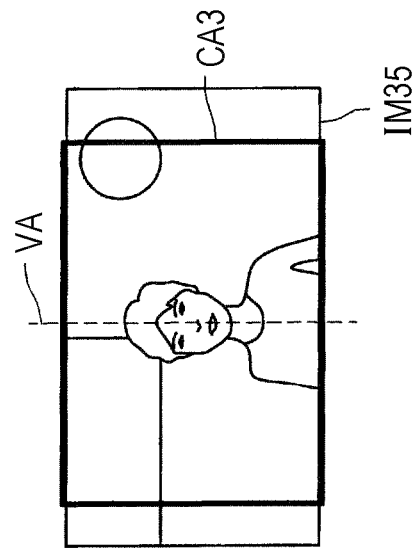
FIGS. 16A to 16F are diagrams illustrating a sixth embodiment of the present disclosure.
Figure 16B:
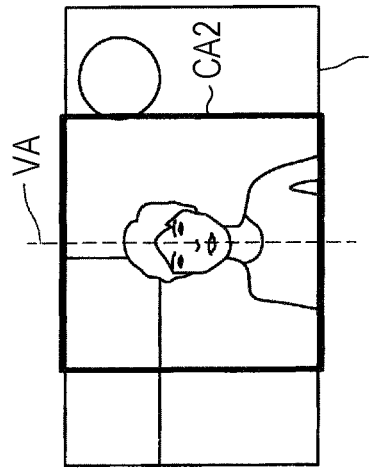
Figure 16C:
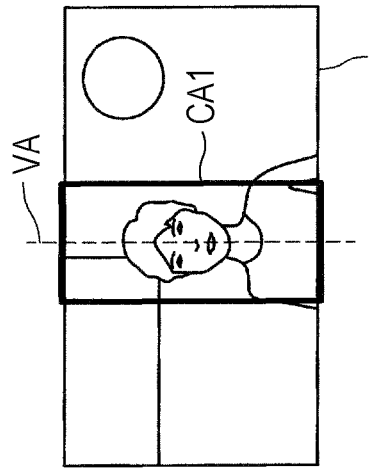

In the sixth example, in a captured image IM35, extraction region CA1, CA2, and CA3 are set using a vertical axis VA which passes the center of a face of a user as a reference as shown in FIGS. 16A to 16C.

Figure 16D:
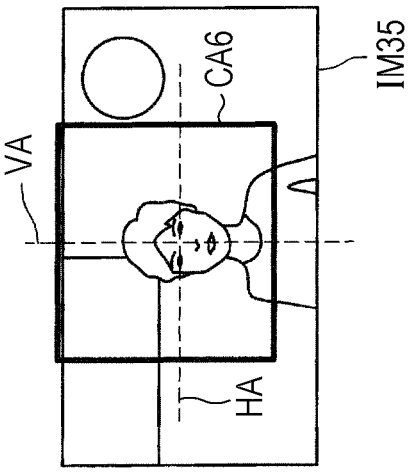
Figure 16E:
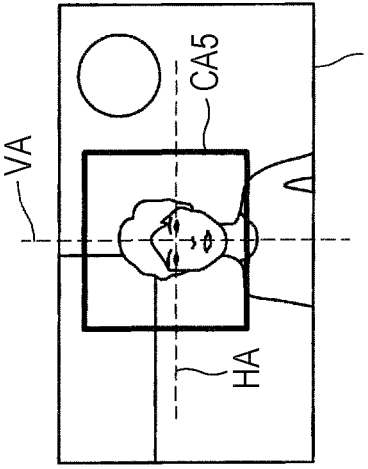
Figure 16F:
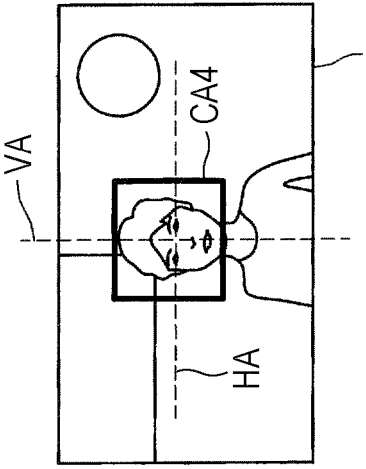

Furthermore, in the sixth example, in the captured image IM35, extraction regions CA4, CA5, and CA6 may be set using the vertical line VA which passes the center of the face of the user and a horizontal axis HA which passes eyes in the face of the user, for example, as references as shown in FIGS. 16D to 16F.

6. Functional Configuration of Information Processing Apparatus (Second Embodiment)

A functional configuration of an information processing apparatus according to a second embodiment of the present disclosure will now be described. FIG. 13 is a diagram illustrating the functional configuration of the information processing apparatus of this embodiment. An information processing apparatus 250 serving as the information processing apparatus of this embodiment is different from the information processing apparatus of the first embodiment described above only in that the information processing apparatus 250 includes an image pickup unit 252 and a display unit 254. Therefore, descriptions of redundant configurations and operations are omitted, and configurations and operations different from those of the first embodiment will be described hereinafter.

Note that, in FIG. 13, a user A who uses the information processing apparatus 250, a communication network 800 to which the information processing apparatus 250 is connectable, a communication server 300 and information processing apparatuses 550 and 750 which are connectable to the communication network 800, users B and C who use the information processing apparatus 550, and a user D who uses the information processing apparatus 750 are shown. The information processing apparatuses 550 and 750 have the same configuration as the information processing apparatus 250, and therefore, detailed descriptions thereof are omitted.

In FIG. 13, the information processing apparatus 250 includes the image pickup unit 252, a detection unit 204, a head-count obtaining unit 206, a setting unit 208, a display image generation unit 210, a communication unit 212, the display unit 254, and a display controller 216.

The image pickup unit 252 is an example of an image pickup unit according to the present disclosure and may capture a still image or a moving image of a user A who watches a display screen of the display unit 254. Then, the image pickup unit 252 may transmit a captured image generated through image capturing to the communication unit 212, the detection unit 204, and display image generation unit 210.

The display unit 254 is an example of a display unit of the present disclosure and may display content of a still image or a moving image and captured images supplied from the information processing apparatuses 550 and 750 in parallel. For example, the display unit 254 may display content of a still image or a moving image in a display region for content and display captured images supplied from the information processing apparatuses 550 and 750 in a display region for captured images supplied from the information processing apparatuses 550 and 750 in the display screen.

According to this embodiment, when the information processing apparatus 250 executes the display process described with reference to FIG. 4, advantages similar to those of the first embodiment described above may be attained. Furthermore, this embodiment may be carried out without separately providing the display system 100 shown in FIG. 2, for example.

Furthermore, an object of the present disclosure may be achieved by supplying a storage medium, such as a non-transitory storage medium, which stores a program code of software which realizes functions of the foregoing embodiments to a system or an apparatus and reading and executing the program code stored in the storage medium using a computer (or a CPU, an MPU, or the like) of the system or the apparatus.

In this case, the program code which is read from the storage medium realizes the functions of the foregoing embodiments, and the program code and the storage medium which stores the program code are included in the present disclosure.

Furthermore, examples of the storage medium to which the program code is supplied include a floppy (registered trademark) disk, a hard disk, a magneto-optical disc, an optical disc such as an CD-ROM, a CD-R, a CD-RW, a DVD-ROM, a DVD-RAM, a DVD-RW, or a DVD+RW, a magnetic tape, a nonvolatile memory card, and a ROM. Alternatively, the program code may be downloaded through a network.

Furthermore, the present disclosure includes, in addition to the case where the functions of the foregoing embodiments are realized by executing the program code read by the computer, a case where an OS (Operating System) operating in a computer performs a part of or entire actual process in accordance with an instruction of the program code and the functions of the foregoing embodiments are realized by the process.

The present disclosure further includes a case where, after the program code read from the storage medium is written to a memory included in a function expansion board inserted into the computer or a function expansion unit connected to the computer, a CPU or the like included in the expansion board or the expansion unit executes a part of or entire actual process in accordance with an instruction of the program code and the functions of the foregoing embodiments are realized by the process.

Although the embodiments of the present disclosure have been described hereinabove with reference to the accompanying drawings, the present disclosure is not limited to the examples. It is apparent to those who skilled in the art that various modifications and variations may be made within the scope of the present disclosure and these modifications and the variations also belong to the scope of the present disclosure.

For example, the communication server 300 may detect face regions including faces of users who use the information processing apparatuses 500 and 700 in captured images supplied from the information processing apparatuses 500 and 700.

Furthermore, the information processing apparatus 200 may transmit content desired by the user A to the information processing apparatuses 500 and 700 so that the content is shared by the users.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a processor:
to specify a number of users who use a plurality of first information processing apparatuses at a same time, in which at least one of the first information processing apparatuses is external to the information processing apparatus, from information on detection of a face region including a face in a captured image provided from each of the first information processing apparatuses at the information processing apparatus;
to set a display region for content and a display region for a captured image in a display screen; and
to generate a display image to be displayed in the display region for a captured image, in accordance with the information on the detection, the number of users, and the display region set for a captured image,
in which the faces of the respective users are arranged in the display region for a captured image in a horizontal direction, a vertical direction or a matrix, in accordance with the number of users and the display region set for a captured image.

2. The apparatus of claim 1, wherein the display region for a captured image includes at least a face feature portion of the face of each user of the number of users.

3. The apparatus of claim 1, wherein the captured image from the at least one of the first information processing apparatuses is provided by communication.

4. The apparatus of claim 1, wherein content is displayed reduced in size in the display region for content.

5. The apparatus of claim 4, wherein the content is content indicated by a user of the apparatus.

6. The apparatus of claim 1, wherein the processor is to detect a face region including a face in the captured image.

7. The apparatus of claim 1, wherein the information on the detection from the at least one of the first information processing apparatuses is communicated.

8. An information processing method to be executed by an information processing apparatus, the method comprising:
- specifying a number of users who use a plurality of first information processing apparatuses at a same time, in which at least one of the first information processing apparatuses is external to the information processing apparatus, from information on detection of a face region including a face in a captured image from each of the first information processing apparatuses;
- setting a display region for content and a display region for a captured image in a display screen; and
- generating a display image to be displayed in the display region for a captured image, in accordance with the information on the detection, the number of users, and the display region set for a captured image,
- in which the faces of the respective users are arranged in the display region for a captured image in a horizontal direction, a vertical direction or a matrix, in accordance with the number of users and the display region set for a captured image,
- wherein at least one of the obtaining, the setting and the generating is by a processor.

9. The information processing apparatus of claim 1, wherein the faces are arranged in the display region for a captured image based on a display ratio of the display region for content to the display region for a captured image obtained through an input for setting of the display ratio.

10. An information processing apparatus comprising:
- a processor:
- to specify a number of users from information on detection of a face region in at least one captured image provided at the apparatus;
- to set a first display region for content and a second display region for the at least one captured image in a display screen; and
- to generate at least one display image to be displayed in the second display region for the at least one captured image, in accordance with the information on the detection, the number of users, and the display region set for the at least one captured image,
- wherein said processor is configured to change a display ratio of the first display region for content to the second display region for the least one captured image or direction of each image displayed in the second display region according to the number of users.

11. The apparatus of claim 10 further comprising an image pick up device fixed in the apparatus configured to capture an image in front of the apparatus.

12. The apparatus of claim 10, wherein at least one of the at least one captured image is transmitted from another information processing apparatus.

13. The apparatus of claim 11, wherein the at least one image displayed in the second display region includes an image captured by the apparatus and at least one image transmitted from another information processing apparatus.

14. The apparatus of claim 10, wherein the faces of the respective users are arranged in a matrix.

15. The apparatus of claim 10, wherein the second display region includes an invalid region other than a region in which the at least one captured image is displayed.

16. The apparatus of claim 10, wherein, when a distance between the detected faces is under a predetermined value, said detected faces are treated as a single face.

17. The apparatus of claim 10, wherein the display ratio is decreased when the number of users is increased.

18. The apparatus of claim 10, wherein the display ratio is changed according to the number of users.

* * * * *